UNITED STATES PATENT OFFICE.

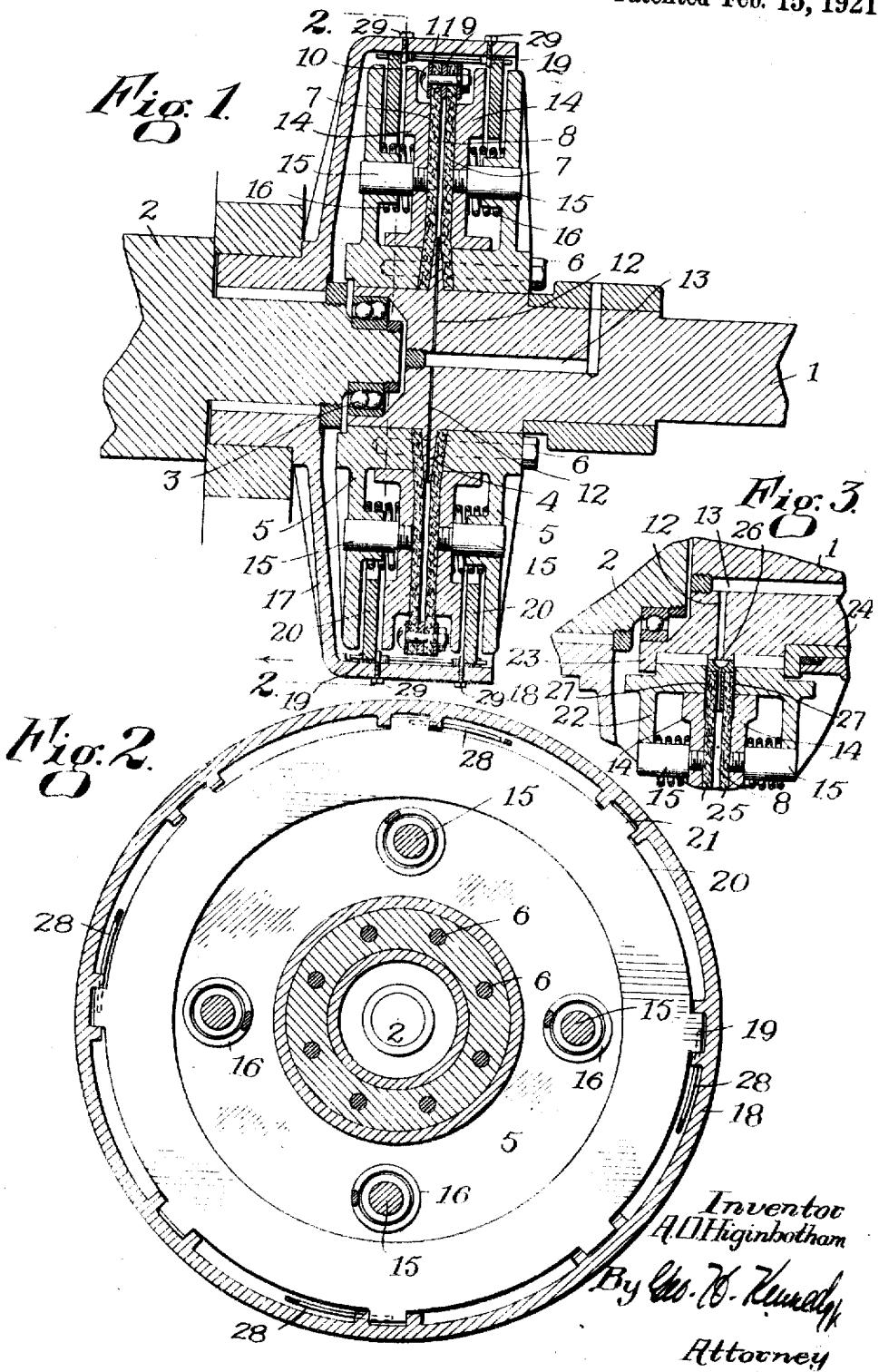

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

FLUID-PRESSURE CLUTCH.

1,368,434. Specification of Letters Patent. Patented Feb. 15, 1921.

Application filed February 9, 1917. Serial No. 147,701.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Fluid-Pressure Clutches, of which the following, together with the accompanying drawing, is a specification.

The present invention relates to the construction of a fluid pressure clutch, in the form of a cheap and easily assembled mechanism adapted to establish and disestablish an efficient and easily controlled driving connection between driving and driven members, by the use of a fluid, such as air, or oil, under pressure.

The invention is fully set forth in the following description, and illustrated, by way of example, in the construction disclosed in the accompanying drawings, in which—

Figure 1 is a sectional view of one form of fluid pressure clutch embodying my invention.

Fig. 2 is a transverse sectional view thereof on the line 2—2, Fig. 1.

Fig. 3 is a fragmentary sectional view, similar to Fig. 1, illustrating a modified construction.

Like reference characters refer to like parts in the different figures.

In the drawings the clutch is shown in its relation to a driving shaft 1 and a driven shaft 2, the latter being supported for rotation in axial alinement with the former by a bearing 3. The driving shaft 1 provides an annular projection 4, encircling the same near its end for a specific purpose hereinafter set forth, and this projection is utilized for the attachment to said shaft of a pair of oppositely facing disks 5, one on each side of said projection, the hubs of said disks being secured together by a series of bolts 6 passing through said annular projection 4. The hubs of said disks provide clamping means for a pair of flexible annular members 7, the inner edges of which are pressed firmly into fluid tight contact with the sides of the projection 4, by tightening up on the bolts 6, as will readily be seen. The space 8 between the members 7, 7, is made fluid tight by joining them securely at their outer edges, a spacing or packing ring 9, or other equivalent means, being employed for this purpose, in conjunction with a series of screw bolts 10 and washers 11 suitably spaced around the periphery of the structure thus formed.

The annular projection 4 of shaft 1 is utilized for the provision of a series of radial pressure ports 12 leading to space 8, the inner ends of said ports 12 communicating with a fluid passage 13 in the center of shaft 1, the latter being connected in any suitable way to a device, such as a valve or cock, not shown, for controlling at will the admission and exhaust of pressure medium to the space 8 for operating the clutch. The outer sides of flexible annular members 7 bear against the corresponding sides of oppositely facing slidable plates 14. The latter are preferably guided in their movements by a series of attached studs 15, here shown as four in number, which pass loosely through corresponding bearing apertures in the disks 5. Springs 16 interposed between disks 5 and plates 14, and surrounding said studs 15, operate to yieldingly press said plates against the flexible members 7, when the clutch is inoperative, in the position of parts indicated in Fig. 1.

The mechanism thus far described constitutes the structure which rotates constantly with the driving shaft 1, in the manner common to devices of this class. To utilize such structure for the rotation of the driven shaft, when said clutch is rendered operative, said driven shaft has keyed thereon a spider 17, having a rim 18 surrounding the outer periphery of the driving structure. On its inner face said rim 18 provides two annular series of recesses 19, one series for each of the rings 20 which are interposed in the spaces between the disks 5 and plates 14 near the outer edges of the latter beyond studs 15. The rings 20 have projections 21 received within recesses 19 of spider 17, so as to compel rotation of said spider with said rings, but permitting said rings to move freely, axially with respect thereto.

The operation of my improved clutch will be readily apparent. In the position of parts shown in Fig. 1, before pressure medium is admitted to space 8, the springs 16 of the rotating driving structure hold the plates 14 out of contact with rings 20, so that no rotation is imparted to the driven member. When the controlling devices, not shown, are operated to admit pressure medium to the space 8 the flexible members 7, 7, are distended, to move the slidable plates 14 apart, this movement being suitably guided by the movement of the studs 15 in the relatively stationary disks 5 of the driving structure. As a consequence, the slidable rings 20 are forced apart to the limit of their movement; the outer faces of said rings are pressed into frictional contact with the opposing faces of disks 5 and the inner faces of said rings are maintained in similar contact with the outer faces of plates 14. The extended frictional surface thus formed, aggregating substantially the total area of both rings 20, is amply sufficient to insure the transmission of rotation to the driven structure constituted by the spider 17 and rings 20, it being clear that as soon as the pressure in space 8 is released, the springs 16 will cause the parts to return to their positions as illustrated in Fig. 1, thus disconnecting the driving and driven shafts.

The modification disclosed in Fig. 3 is a slight variation in the manner of assembling the driving structure, the disks 22, corresponding substantially to the disks 5 of Fig. 1, being keyed to the driving shaft 1, and clamped between a flange 23 and a bushing 24 by means of a nut, not shown, which bears on said bushing. The flexible annular members 25, corresponding substantially to the members 7 of Fig. 1 are carried at their inner edges by a ported ring 26, which is held between the hubs of disks 22 and is constructed to establish communication of the space 8 between members 25, and the fluid pressure supply, in precisely the same manner as previously described. In all other respects the modification illustrated in Fig. 3 is the same in construction and operation as that shown in Fig. 1, the several parts being denoted by the same reference characters. In this modification I prefer to interpose between the flexible annular members 25 and the plates, the thin annular washers 27, Fig. 3, which extend beyond the disks 22 and thereby prevent the cutting and wearing of members 25 on the sharp corners of said hubs, when said members 25 are dilated to move the plates 14.

In both of the herein illustrated forms of my device, I prefer to provide some means for causing the ring 20 of the driven member to return to the position shown in Fig. 1, after the clutch has been rendered inoperative by the exhaust of pressure medium from the space 8, such means being shown only in Figs. 1 and 2. To this end, the rings 20 are acted upon by a plurality of substantially C-shaped springs 28, the free ends of which bear against the outer faces of both rings, tending to draw said rings together. The movement of said rings under the influence of springs 28 is limited by stop screws 29 in the paths of projections 21, so that when the clutch is rendered inoperative the rings 20 assume the positions shown in Fig. 1, midway between the plates 14 and the disks 5, thus permitting the driving member to run free and out of contact entirely with the driven member.

My construction affords a clutching mechanism which is instantly responsive to the admission and exhaust of pressure medium to and from the space 8, and at the same time presents the maximum area of frictional contact for the transmission of large amounts of power. It is to be understood that my invention is susceptible to indefinite multiplication of the axially movable parts of the driving member, to increase the frictional contact surfaces when the same is necessary for the transmission of power, it being clear that additional rings 20 and additional plates 14 may be disposed for co-operation with additional disks 5 on the driving shaft 1. According to the construction proposed, practically the entire weight of the clutch is carried on the driving member, where it takes the place, if desired, of the usual fly wheel, especially in motor vehicle construction. On the other hand, the weight of the parts carried by the driven shaft 2 is extremely light, thus reducing, in comparison to nearly all clutches of this type, the inertia to be overcome when the clutch is rendered operative.

I claim,

1. In a device of the character described, a driving member and a driven member, one of said members having a pair of axially movable rings, engaging the periphery of said member, the other member having two pairs of plates rotatable with said member and inclosing said annular rings, with one of the plates of each pair axially movable, and means for introducing fluid pressure between said axially movable plates.

2. In a device of the character described, a driving and a driven member, one of said members having a pair of stationary plates and a pair of axially movable plates between said stationary plates and rotatable with said member, means for applying a fluid pressure between said movable plates to force them toward the stationary plates, the other member having a rim inclosing said plates, a pair of annular rings, rotatable with said rim and axially movable thereon, said rings being interposed between said stationary and said movable plates.

3. In a device of the character described, a driving and a driven member, one of said members carrying a stationary plate and an axially movable plate, means for applying a fluid pressure to force the movable plate toward the stationary plate, the other member having a rim inclosing said plates, rings rotatable with said rim and axially movable thereon, springs for axially moving said rings in one direction, and stops for limiting the axial movement of said rings as moved by said springs.

4. In a device of the character described, a driving and a driven member, one of said members carrying a pair of radial plates, one stationary and the other axially movable, a spring for forcing said plates apart, means for applying fluid pressure to force said movable plate toward said stationary plate against the tension of said spring, a rim carried by the other member of the device inclosing said plates, and a ring rotatable with said rim interposed between said plates.

5. In a device of the character described, a driving member and a driven member, one of said members providing a pair of opposing relatively stationary surfaces, and a pair of oppositely facing relatively movable surfaces each facing one of said first mentioned relatively stationary surfaces, and the other member presenting a portion interposed between each relatively movable surface and its corresponding relatively stationary surface and means for applying a fluid pressure operable to produce a frictional contact upon the opposite surfaces of said interposed portion.

6. In a device of the character described, a driving member and a driven member, one of said members providing a pair of opposing relatively stationary surfaces, and a pair of oppositely facing relatively movable surfaces each facing one of said first mentioned relatively stationary surfaces, and the other member providing a pair of axially movable elements, one interposed between each relatively movable surface and its corresponding relatively stationary surface and means for applying a fluid pressure operable to produce simultaneously a frictional contact on opposite sides of said interposed axially movable elements.

7. In a device of the character described, a driving member and a driven member, one of said members providing a pair of opposing relatively stationary surfaces, and a pair of oppositely facing relatively movable surfaces each facing one of said first mentioned relatively stationary surfaces, the other member providing a pair of axially movable elements, one interposed between each relatively movable surface and its corresponding relatively stationary surface, and a common fluid pressure actuating means operable simultaneously on both of the movable surfaces of the first member.

8. In a device of the character described, a driving and a driven member, one of said members providing a pair of relatively stationary elements and a pair of relatively movable elements, a flexible walled fluid pressure chamber interposed between said movable elements, and a pair of annular rings engaging the other member and interposed between said stationary and said movable elements.

ARTHUR O. HIGINBOTHAM.

Witnesses:
NELLIE WHALEN,
PENELOPE COMBERBACH.